No. 804,548. PATENTED NOV. 14, 1905.
J. PHILIPPSOHN.
CLOTH CUTTING MACHINE.
APPLICATION FILED FEB. 6, 1903.

7 SHEETS—SHEET 1.

Witnesses:
Emil Kayser
Max Wocher

Inventor
Jacob Philippsohn
by Robert Seipler
Attorney.

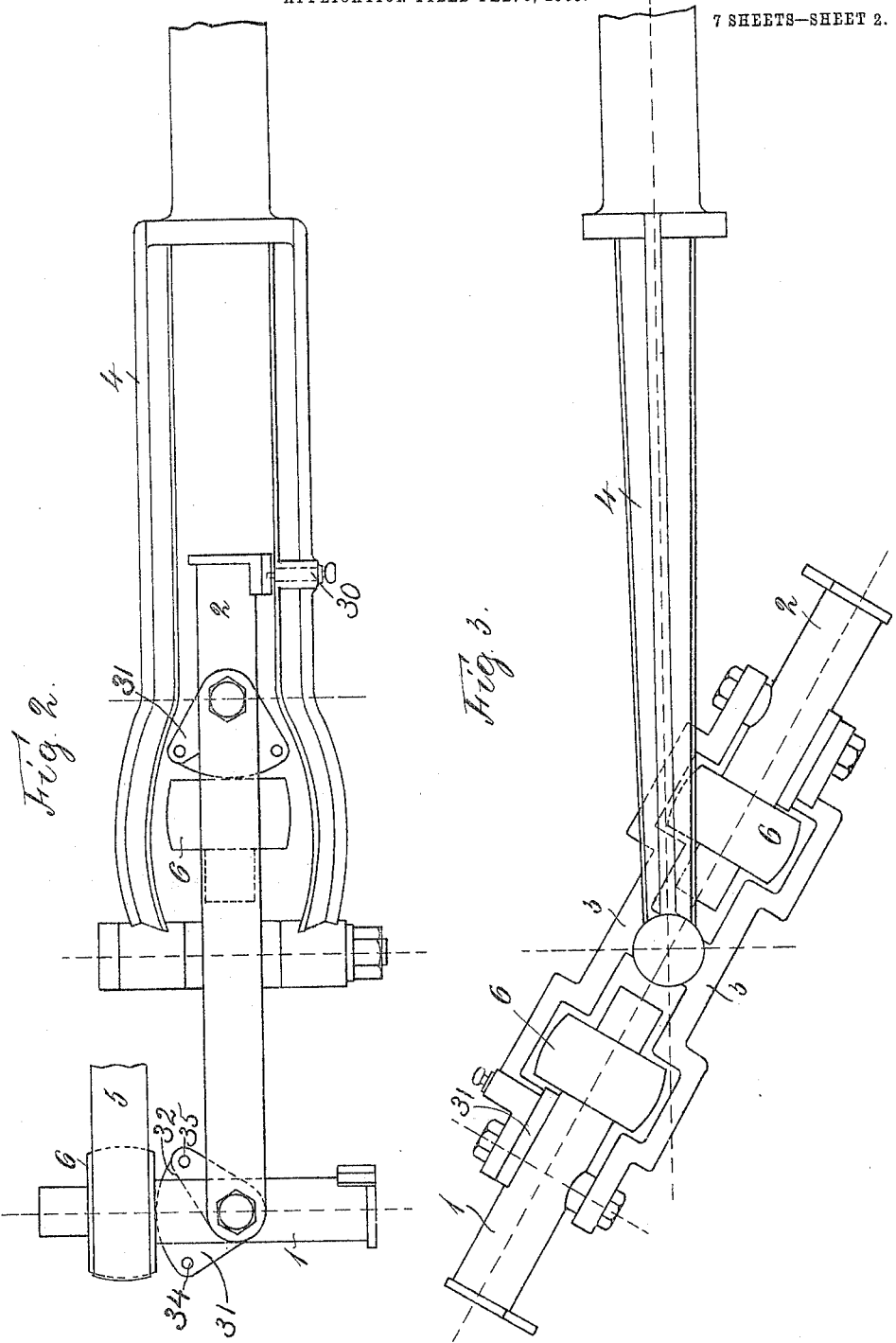

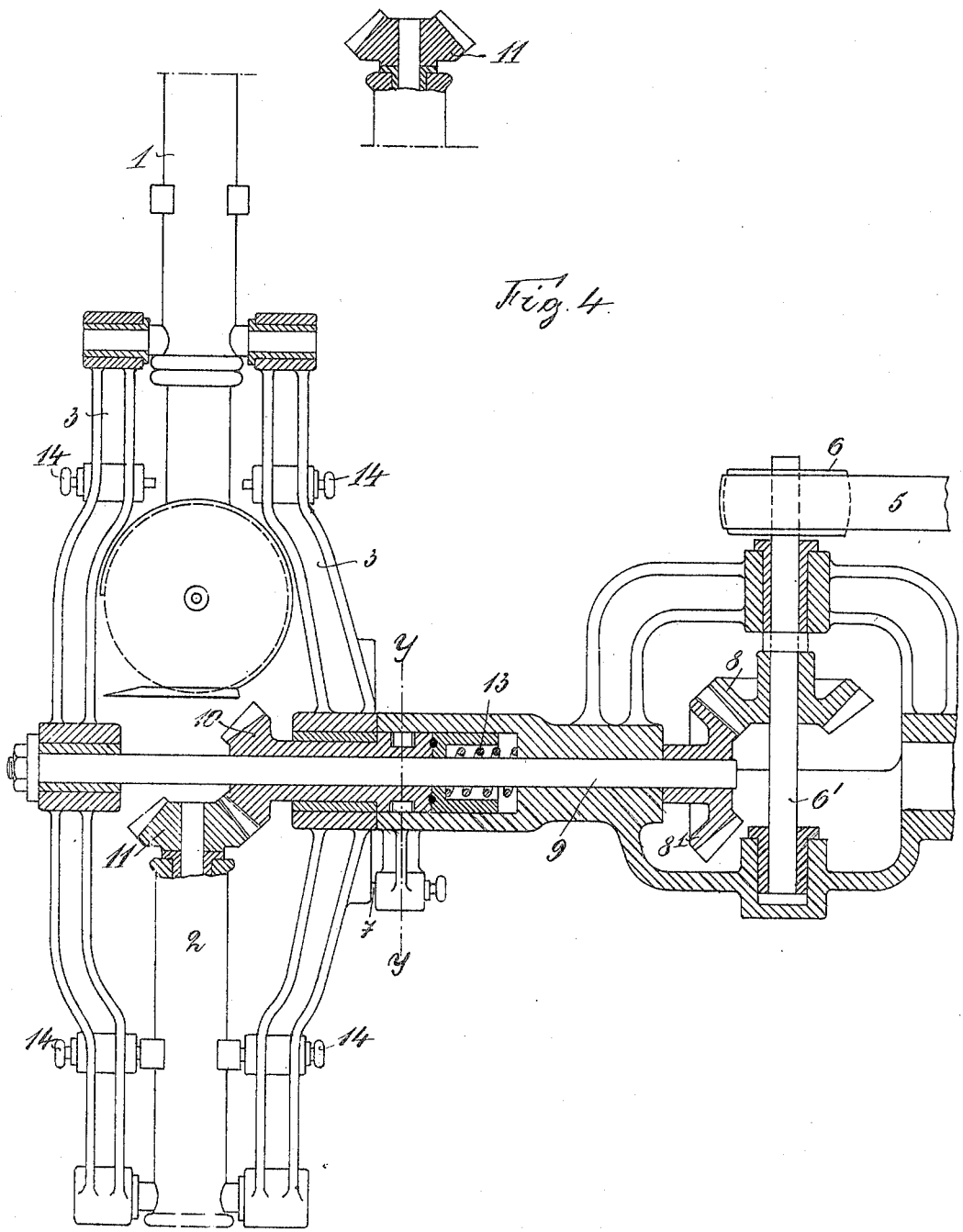

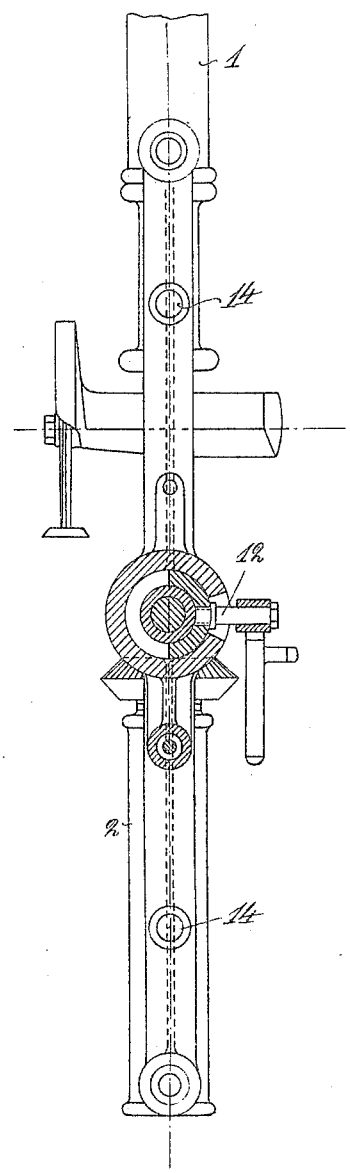
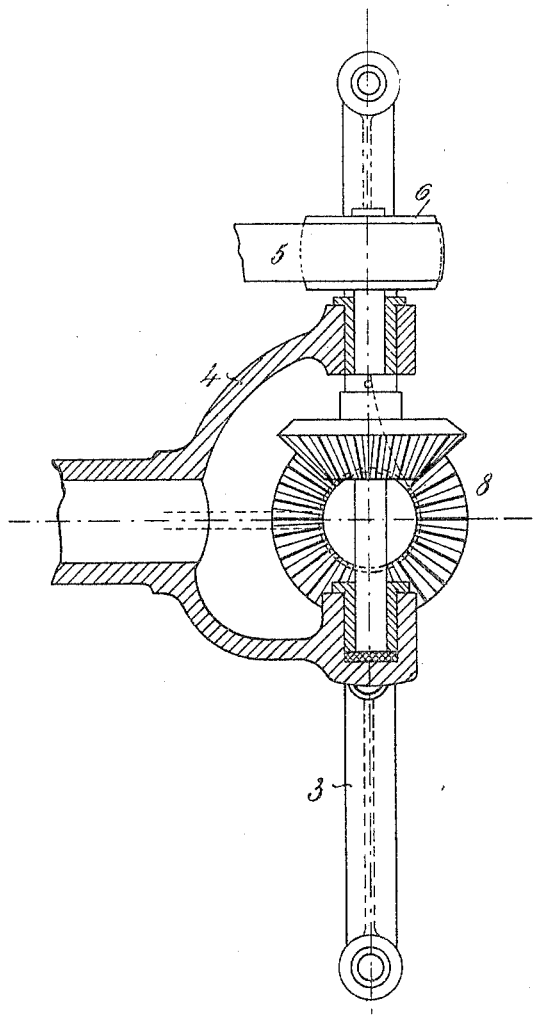

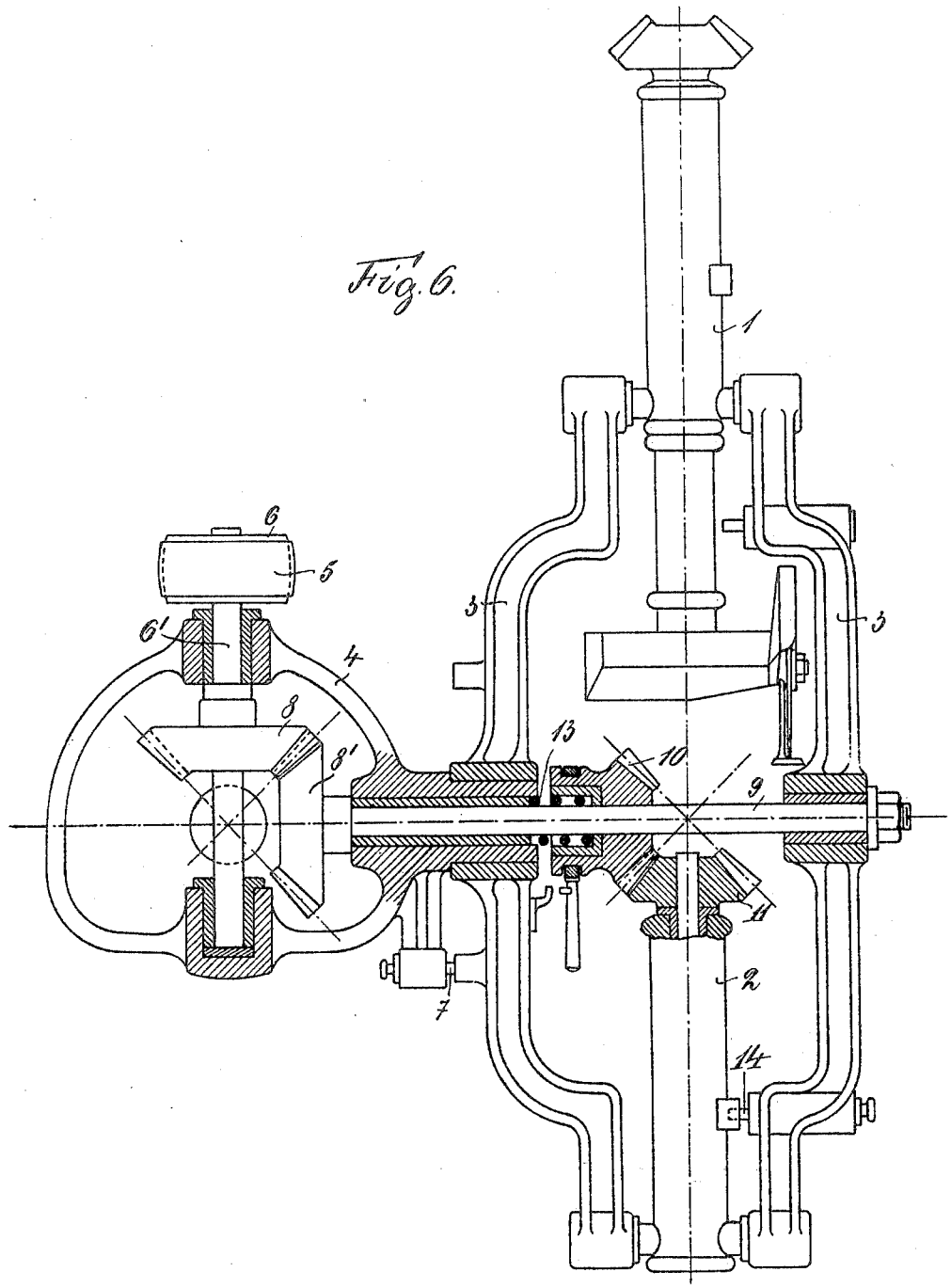

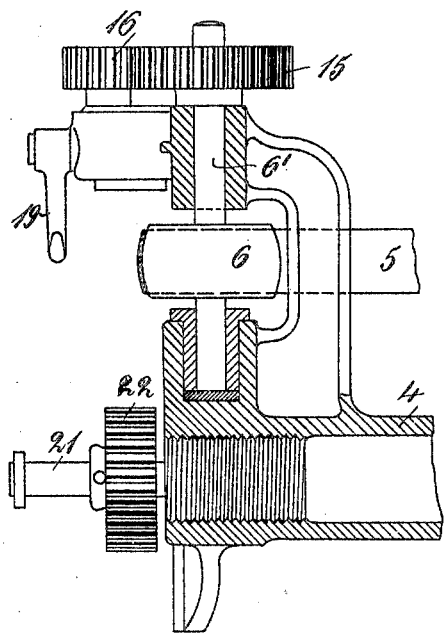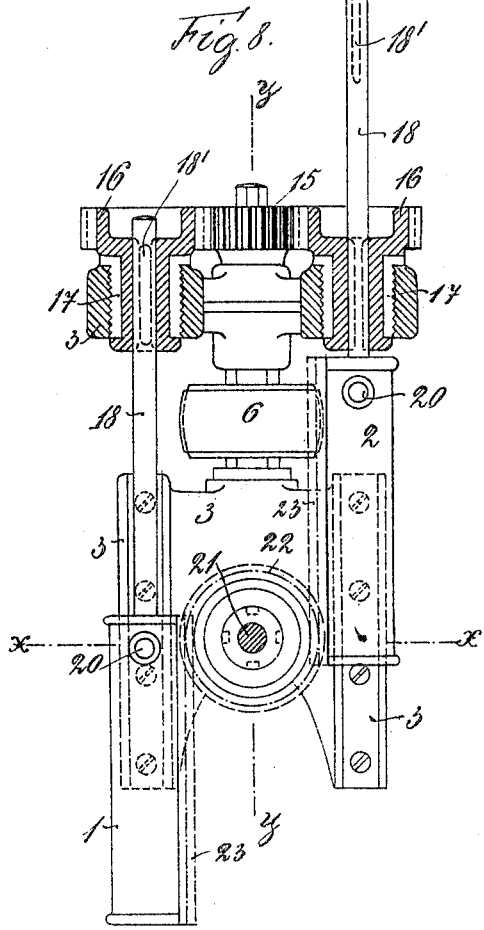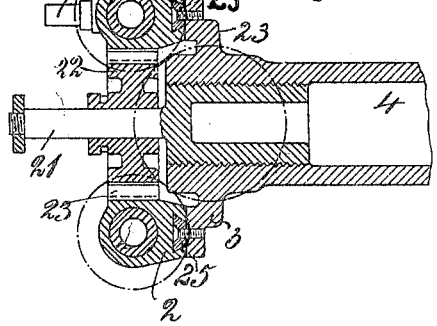

No. 804,548. PATENTED NOV. 14, 1905.
J. PHILIPPSOHN.
CLOTH CUTTING MACHINE.
APPLICATION FILED FEB. 6, 1903.

7 SHEETS—SHEET 7.

UNITED STATES PATENT OFFICE.

JACOB PHILIPPSOHN, OF BERLIN, GERMANY.

CLOTH-CUTTING MACHINE.

No. 804,548. Specification of Letters Patent. Patented Nov. 14, 1905.

Application filed February 6, 1903. Serial No. 142,195.

*To all whom it may concern:*

Be it known that I, JACOB PHILIPPSOHN, a subject of the King of Prussia, German Emperor, and a resident of 41 Kaiserstrasse, Berlin, Kingdom of Prussia, German Empire, have invented certain new and useful Improvements in Cloth-Cutting Machines, of which the following is an exact specification.

My invention relates to a cutting-machine for cutting cloth, linen, and the like, and has for its purpose to provide a machine by means of which any form of cloth can be easily cut out.

The cutting-machines hitherto constructed consist, essentially, of a revolving cutting-disk. This cutting-disk has the disadvantage that curves with a small radius cannot well be cut, as the cutting-disk forms so large a chord with the curve to be cut that the disk cannot well follow this curve. In order to avoid this disadvantage, cutting-machines have been constructed in which a reciprocating knife is provided which works after the manner of a band-saw. By means of such knives curves with very small radius can be cut. These cutting-machines have, however, the disadvantage that the cutting goes on very slowly. In order to avoid this disadvantage, I provide my present invention, which consists of a cutting-machine provided with a revolving cutting-disk and with a reciprocating cutting-blade, so that according to the curve to be cut the respective cutting device most fit for the purpose can be used, means being provided for easily exchanging both cutting devices.

In order to make my invention more clear, I refer to the accompanying drawings, in which—

Figure 1:
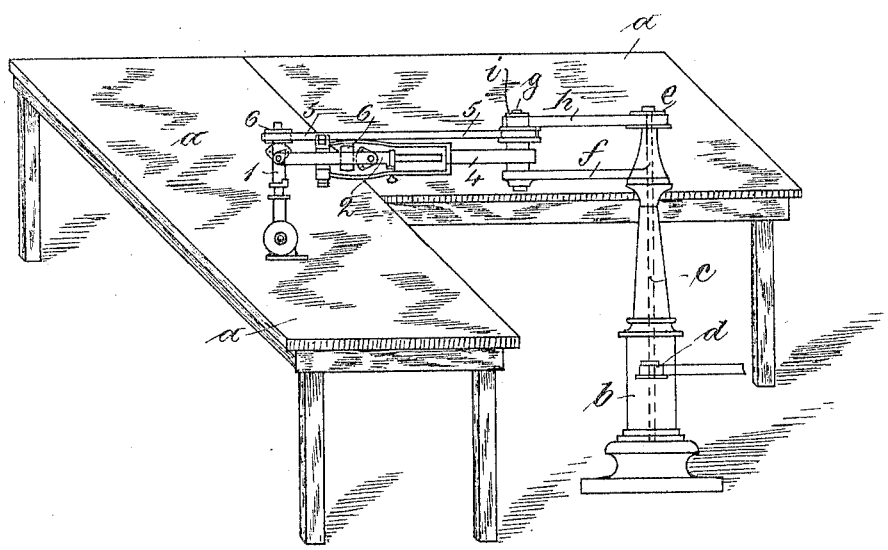
Figure 13:
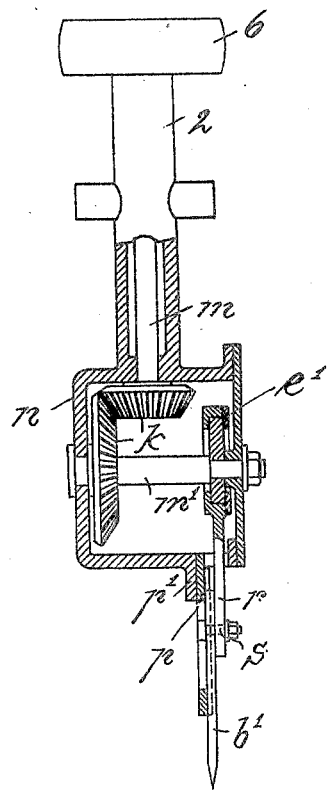
Figure 12:
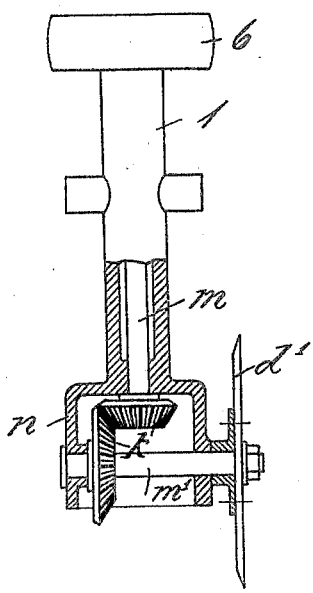

Figure 1 is a view of the whole machine. Figs. 2 and 3 are detail views of the parts carrying the cutting devices and of the means for exchanging the same. Figs. 4 and 5 show a modification of the construction shown in Figs. 2 and 3. Figs. 6 and 7 show a second modification, and Figs. 8, 9, 10, and 11 show a third modification, of these parts. Fig. 12 illustrates the rotating cutting device in section. Fig. 13 illustrates the reciprocating cutting device in section.

Similar characters refer to similar parts throughout the several modifications shown.

In the drawings, Fig. 1, $a$ represents tables upon which the pile of stuff to be cut is placed. $b$ is a standard in which a vertical shaft $c$ is journaled. $d$ is a pulley situated upon the shaft, which pulley can be rotated in any convenient way. $e$ is a pulley situated at the upper end of the shaft $c$. $f$ is a horizontal arm turnable in the horizontal direction. In this arm $f$ a shaft $g$ is journaled, which shaft is driven by means of a belt $h$ and a pulley $i$ from the pulley $e$. 4 is a horizontal arm which can swing around the shaft $g$ and which carries the cutting devices proper. These cutting devices are driven by means of a belt 5 and pulleys 6 or in any other convenient way from the shaft $g$.

It will be understood that the construction of the machine may be modified in different ways and that the machine can be driven by electricity or by any other convenient means, the invention consisting only in the arrangement for exchanging the cutting devices.

In the construction shown in Figs. 2 and 3 the cutting devices proper are not shown, but only the holders 1 and 2 for these cutting devices, and it is assumed that the holder 1 may take up a rotating cutting-disk, and that the holder 2 may take up a reciprocating cutting-blade. Both holders 1 and 2 are journaled in a common frame 3, turnable around its vertical axis. The holders 1 and 2 are turnable around their horizontal axis. The whole frame is carried by the arm 4, which can swing in the horizontal direction, as mentioned above. In both holders 1 and 2 shafts for driving the cutting devices are provided, which shafts are rotated from the axle $g$, Fig. 1, by means of the pulleys 6 and the belt 5. The holder 1 is provided with a cutting-disk, and the movement is transmitted from the pulley 6 to a bevel-gear $k$ by means of the shaft $m$. The cutting-disk $d'$ is mounted upon a small shaft $m'$, arranged in the case $n$ of the holder 1. The holder 2 is provided with a reciprocating cutting-plate, and the turning motion of the pulley 6 is transformed in the same manner as described before upon the shaft $m'$. Thereupon the eccentric $e'$ is arranged, and the cutting-blade $b'$ is fixed to the eccentric-rod $r$ by means of the screw $s$. For guiding the blade $b'$ a plate $p$ is provided, secured to a projection $p'$ of the case $n$ of the holder 2.

In the position shown in Figs. 1 and 2 the holder 1 of the cutting-disk is in the working position. If now the cutting-blade to be fixed in the holder 2 is to be used instead of the cutting-disk, the holder 1, which is fixed in the position shown in Figs. 1 and 2, is swung around its horizontal axle, so as to adopt the position shown in Fig. 3, thereby interrupting the connection of the holder 1 with the axle $g$. Hereafter the frame 3 is turned around its vertical axle, as shown in Fig. 3, until the holder 2 adopts the position of the holder 1, whereafter the holder 2 is swung to the vertical position, and the belt 5 is thrown upon the pulley 6 of the holder 2.

In order to keep the holder out of its working position horizontally within frame 4 as holder 2 in Fig. 2, a set-screw 30 may be provided. Each of the holders 1 and 2 carries a plate 31, rigidly fastened to it and having two bores 34 and 35, whereas the frame 3 carries on each of its ends a projection 32, having a bore at its outer end. In Fig. 2 the holder 1 is kept vertically to frame 3 by a pin being put into the right-hand bore 35 of plate 31 and the bore of the corresponding projection 32. If holder 1 shall be moved out of its working position, this pin is drawn out. The holder is turned so as to be horizontal, so that the bore 34 will be in line with the bore of the projection. The pin is then put in, thereby keeping the holder 1 firmly in its horizontal position. A similar managing is required to bring the holder 2 into or out of its working position.

In the modification shown in Figs. 4 and 5 the frame 3, in which the holders for the cutting devices are journaled, is not turnable in the horizontal, but in the vertical direction. Fig. 4 shows the working parts partly in view and partly in section, and Fig. 5 is a section on line $y\ y$ of Fig. 4. In the position shown in the drawings it is assumed that a cutting-blade to be fixed in the holder 2 is at work. 6 is again a pulley to be driven from the shaft $g$, Fig. 1, by means of a belt 5. The axle 6' of this pulley is in this construction rigidly journaled in the arm 4. Upon the shaft 6' a bevel-gear 8, gearing with the bevel-gear 8', fixed to the shaft 9, is arranged. Upon the shaft 9 a second bevel-gear 10, movable in the longitudinal direction of the shaft, is situated. This bevel-gear 10 gears in the working position with a bevel-gear 11, provided at the upper end of the holders for the cutting devices. The effect of this construction is as follows: If instead of the cutting-blade the cutting-disk shall be used, the operator loosens the set-screw 7, which serves for holding the frame 3 in its position. Hereafter the bevel-gear 10 is moved backward by means of the device 12 against the effect of the spiral spring 13, so that this bevel-gear does not gear any more with the bevel-gear 11 of the holder 2. It will be understood that devices may be provided for holding the bevel-gear 10 in this position. Hereafter the frame 3 is turned around an angle of one hundred and eighty degrees, so that the holder 1 is in the position of the holder 2. The frame is then fixed in this position, and the bevel-gear 10 is released, so that the spring 13 brings this bevel-gear back in the position shown in the drawings, in which position it now gears with the bevel-gear 11 of the holder 1, hereby operating the cutting-disk. In order to avoid a swinging of the holders 1 and 2 in their working position, set-screws 14 are provided.

The modification shown in Figs. 6 and 7 differs from the construction shown in Figs. 4 and 5 by the frame 3, carrying the holders 1 and 2 for the cutting device, not swinging around an axle situated in the longitudinal axle of the arm 4, but around an axle situated at right angles to this axle. Also in this construction the belt 5 transmits the movement of the axle $g$, Fig. 1, to the pulley 6, fixed to the axle 6'. The extremity of the arm 4 forms a casing for the bevel-gears 8 and 8', by means of which the movement is transferred to the shaft 9. As may be seen from Fig. 6, this shaft is journaled in a sideward-projecting part of the arm 4. In the drawings the holder 2 for the reciprocating blade is in the working position, while the rotating disk is situated above the shaft 9, so that the same is not in the way. The cutting devices are actuated in the manner described above in connection with the construction shown in Figs. 4 and 5 by means of a bevel-gear 10, movable in the longitudinal axis of the shaft 9 and gearing with the bevel-gears 11 of the holders for the cutting devices.

As may be seen from Fig. 6, the nave of the left-hand part of the frame 3 is journaled around the sideward-projecting part of the arm 4, while the right-hand part of this frame is journaled around a bushing fixed to the shaft 9. This has the advantage over the construction shown in Figs. 4 and 5 that the weight of the frame 3 and of the cutting devices journaled within the same is only partly carried by the shaft 9. The effect of the device is the same as of the construction described above.

A further modification of the construction is shown in Figs. 8 to 11. Fig. 8 shows partly a front view and partly a section of the construction. Fig. 9 is a section of line $x\ x$ of Fig. 8. Fig. 10 is a vertical section on line $y\ y$ of Fig. 8, and Fig. 11 is partly a plan of the construction. In this construction the frame 3, situated at the extremity of the arm 4, is not turnable, but is rigidly fixed to this arm. The holders 1 and 2 for the cutting devices are guided in vertical slides 25 of the frame 3. 6 is again the pulley driven by means of the belt 5. To the axle 6' of this pulley a gear 15 is fixed which gears with the gears 16. These gears 16 are secured against vertical movement by the bushings 17, fixed in the frame 3. The gears 16 are situated upon shafts 18, which actuate the cutting devices fixed to the holders 1 and 2.

In order that the cutting devices may be only actuated in case the holders are in their working position, the shaft 18 is provided with a key 18', situated in the upper part of the shaft, which key enters into the key-groove of the gear 16 just before the holder arrives in its working position. It will be understood that instead of connecting the shafts 18 with the gears 16 by means of a key and a key-groove any other connecting device may be provided. In the position shown in Fig. 1 the holder 1 for the cutting-disk is in the working position. If now small curves shall be cut, the cutting-blade must be used. For this purpose the holder 1 is shifted upward until a hook 19 can be placed around a pin 20, fixed to the holder. During this upward movement of the holder 1 the key 18' of the shaft 18 of this holder has left its key-groove, so that the shaft 18 is no more rotated and the cutting-disk no more actuated. Hereafter the hook 19 for holding the holder 2 is released from the pin 20 of this holder and the holder 2 is lowered. Before the holder arrives in the working position the key 18' enters into the key-groove of the gear 16 and the cutting-blade fixed to the holder 2 begins to work.

In order that one cutting device may be automatically brought into the working position if the other one is brought out of the same, the following arrangement may be provided: To the frame 3 a tenon 21 is fixed, around which turns a gear 22. This gear 22 gears with toothed bars 23, fixed to the holders 1 and 2. It is hereby attained that in case one holder is lowered the other one is automatically raised.

In order that both cutting devices may be set simultaneously out of work, the gear 22 may be movable in the longitudinal direction of the tenon 21, so that the same may be brought out of gear with the toothed bars 23.

Having thus fully described the nature of this invention, what I desire to secure by Letters Patent of the United States is—

In a cloth-cutting machine, the combination of a cutting-disk and a cutting-blade, a holder for the cutting-disk, a holder for the cutting-blade, means for bringing both holders alternately into the working position and means for operating the holder, which is in the working position, substantially as described and for the purpose set forth.

In testimony whereof I have signed my name to this specification in the presence of two subscribing witnesses.

JACOB PHILIPPSOHN.

Witnesses:
 HENRY HASPER,
 WOLDEMAR HAUPT.